United States Patent [19]

Priest

[11] 4,006,084
[45] Feb. 1, 1977

[54] OIL RECLAIMING DEVICE

[76] Inventor: Glen R. Priest, Rte. 1, Box 3, Landmark Estates, Geronimo, Okla. 73543

[22] Filed: Dec. 26, 1974

[21] Appl. No.: 536,378

Related U.S. Application Data

[63] Continuation-in-part of Ser. No. 358,893, May 10, 1973, abandoned.

[52] U.S. Cl. ............................ 210/180; 210/183; 210/184; 210/436; 210/498; 196/46.1; 196/128; 208/179
[51] Int. Cl.[2] ........................................ B01D 3/28
[58] Field of Search .......... 196/46.1, 128; 219/463, 219/467; 210/180, 184, 183, 243, 498, 168, 320, 436, 136, 71; 208/179

[56] References Cited

UNITED STATES PATENTS

| | | | |
|---|---|---|---|
| 2,785,109 | 3/1957 | Schwalge | 210/180 |
| 2,839,196 | 6/1958 | Schwalge | 210/180 |
| 2,909,284 | 10/1959 | Watkins | 210/180 |
| 3,550,781 | 12/1970 | Barrow | 210/180 |
| 3,616,885 | 11/1971 | Priest | 210/180 |
| 3,756,412 | 9/1973 | Barrow | 210/180 |
| 3,915,860 | 10/1975 | Priest | 210/180 |

Primary Examiner—Charles N. Hart
Assistant Examiner—Ernest G. Therkorn
Attorney, Agent, or Firm—H. Mathews Garland

[57] ABSTRACT

A device for use with an internal combustion engine for reconditioning oil by removal of solid and liquid contaminants including a housing having an oil inlet at one end and an oil outlet at an opposite end and containing a filter for removal of solid matter, a preheating chamber, a vaporization chamber for removal of liquid contaminants, and a convex conical vaporization plate separating and defining the roof of the preheating chamber and the floor of the vaporization chamber. The vaporization plate has a plurality of concentric tiers. The upper innermost tier of the vaporization plate has a plurality of capillaries each of which opens to the top planar surface of the tier through an expansion cup defined within an upwardly protruding lip. An electrical resistance heater is supported above the vaporization chamber for heating the vaporization chamber, the vaporization plate, and the preheating chamber. A vent for vaporized contaminants extends through the upper end of the housing. The device is connected in the oil circulation system of the engine with oil being pumped through the inlet into the filter for removal of solid contaminants. The oil and liquid contaminants flow from the filter into the preheating chamber, through the capillaries in the vaporization plate, and into the vaporization chamber flowing outwardly and downwardly along the top surfaces of the plate for vaporization of the liquid contaminants. The reconditioned oil flows out the oil outlet while the vaporized liquid contaminants flow from the device through the vent.

9 Claims, 5 Drawing Figures

OIL RECLAIMING DEVICE

This application is a continuation-in-part of application Ser. No. 358,893 filed May 10, 1973, entitled OIL RECLAIMING DEVICE, now abandoned.

This invention relates to apparatus for separating solid and liquid contaminants from lubricating oil in the oil recirculation system of an internal combustion engine. More particularly this invention relates to a device which utilizes both mechanical filtering and heating to separate solid and liquid contaminants from lubricating oil.

Contaminated lubricating oil used in internal combustion engines is a principal cause of excessive wear and deterioration of such engines. A major portion of internal combustion engines used at the present time include lubricating oil systems which contain only a conventional mechanical filter for separating such materials as dirt, carbon, metal particles, and other similar foreign matter. Liquid contaminants such as condensates, water, and fuel are often emulsified in the lubricating oil and cannot be separated by a filter. It is therefore necessary that the lubricating oil of all internal combustion engines using conventional filters be changed at sufficiently regular intervals to minimize engine damage by contaminants. With the present world-wide fuel shortage which is developing it is imperative that systems be developed which will recondition lubricating oil so that it may be used substantially indefinitely thereby requiring only small amounts of makeup oil as required by engine usage. The problems of the liquid contaminants have been recognized and some efforts have been made to develop devices which use heat as a mechanism for separating oil and contaminants. One such device is disclosed in my U.S. Pat. No. 3,616,885. Several problems have been found, however, in the use of such device including a long warm-up period and substantial circulation back pressure. The vaporization plate in my patented device is a thick solid member which has been found to have so much mass that the warm-up time before the system becomes operative is so long that the device will not recondition oil satisfactorily in short time stop and go driving so characteristic of city conditions. Also, the use of the solid form of vaporization plate does not provide a preheating chamber as disclosed and claimed in the device of the present invention and additionally the long capillary passages in the essentially solid vaporization plate present substantial back pressure to flow of lubricating oil through the device.

Comparative operating tests of a device constructed in accordance with the patent and a device embodying the features of the present invention demonstrated that after an hour of operation the oil temperature in the patented device went only from 35° to 45° F. and a circulation of only 43 percent while the device constructed in accordance with the present invention raised the oil temperature from 35° F. to 205° F. with 100 percent of the oil in the system flowing through the oil reclaiming device. Other comparative tests demonstrated the inadequacies of the patented device for short driving periods. Various other types of devices have been developed for the purposes of solid contaminant separation and liquid contaminant vaporization. None of such other devices, however, use a vaporization plate of the configuration of that of the present invention which defines both a preheating chamber and a vaporization chamber for preconditioning the oil prior to vaporization and for providing maximum distribution of the oil in the vaporization chamber for optimum removal of the liquid contaminants.

It is therefore a principal object of the invention to provide a new and improved device for removing both solid and liquid contaminants from lubricating oil used in an internal combustion engine.

It is another object of the invention to provide an oil reconditioning device which uses a vaporization plate in the shape of a hollow truncated convex cone which has a plurality of concentric tiers defining the roof of a preheating chamber and the floor of a vaporization chamber.

It is another object of the invention to provide a new and improved oil reconditioning device which obtains maximum oil distribution within a vaporization chamber and a preheating chamber which is raised to operating temperature in a minimum amount of time.

It is another object of the invention to provide an oil reconditioning device which has a new and improved form of vaporization plate which provides minimum back pressure in the flow of oil through the device.

In accordance with the present invention an oil reconditioning device is provided for use with an internal combustion engine to mechanically remove solid contaminants and to vaporize and separate liquid contaminants, such device including a housing having an oil inlet at a first end and an oil outlet at a second opposite end, a filter for solid contaminant removal within the container in the flow path of the oil inlet, a preheating chamber at the second end of the housing downstream from the filter, a vaporization chamber at the second end of the housing, a convex frustoconical vaporization plate formed by a plurality of concentric tiers in the second end of the housing on the filter separating the preheating and vaporization chambers and defining a concave conical roof of the preheating chamber and a convex conical floor of the vaporization chamber, the upper tier of the vaporization plate having a plurality of a capillaries each opening through an expansion cup defined by an annular lip in the top surface of the top tier of the vaporization plate, an annular electrical resistance heater supported in the second end of the housing above the vaporization chamber, an annular shield between the electrical heater and the vaporization chamber, and a vent passage for vaporized contaminants extending through the second end of the housing into the vaporization chamber.

The device is connected in the circulation system of an internal combustion engine so that the oil pump forces the lubricating oil through the device. The oil flows initially through the filter of the device into the preheating chamber. The filter removes the solid contaminants. In the preheating chamber the oil is heated to the extent that the more volatile liquid contaminants are vaporized below the vaporization plate. The vaporized contaminants in the oil along with the less volatile contaminants pass through the capillaries in the vaporization plate into the vaporization chamber. In the vaporization chamber the oil expands from the capillaries in the expansion cups flowing over the lips around the cups onto the flat surface of the top tier of the vaporization plate where the oil flows outwardly and downwardly along the several tiers of the plate. The oil is further substantially heated vaporizing the remainder of the volatile contaminants. The reconditioned oil flows from the outlet of the housing while the vaporized contaminants pass out of the housing through the vent passage. The reconditioned oil is recirculated through the engine.

The foregoing objects and advantages of the invention together with an understanding of a preferred embodiment of an oil reconditioning device constructed in accordance with the invention may be had from the following detailed description taken in conjunction with the accompanying drawings wherein.

Figure 1:
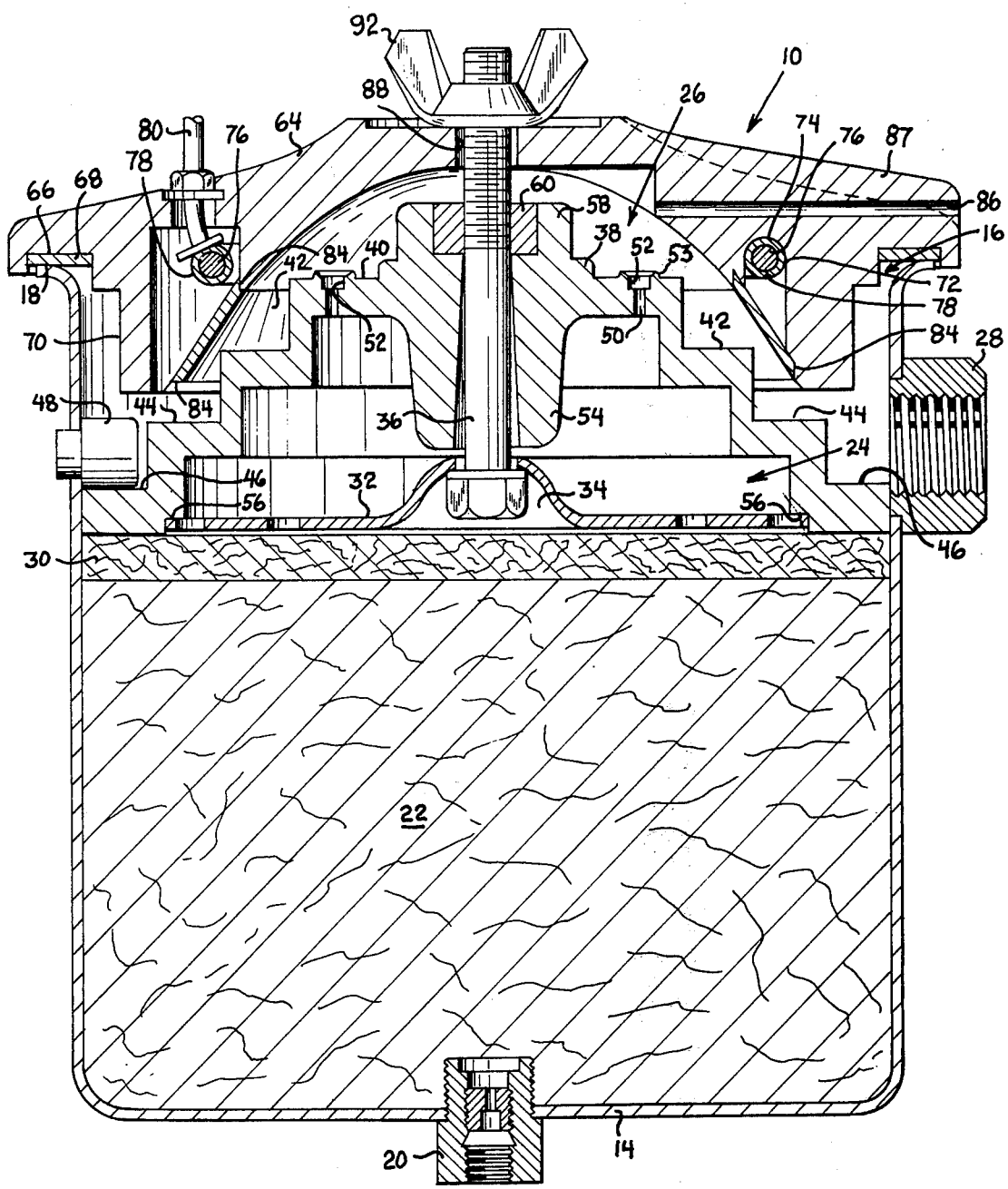
FIG. 1 is a longitudinal view in section and elevation of a preferred embodiment of an oil reconditioning device in accordance with the invention.

Referring to the drawings, an oil reclaiming device 10 in accordance with the invention includes a cylindrical housing 14 having a closed bottom and an open upper end 16. The housing may be formed of a suitable material such as steel. The side wall of the housing at the open upper end 16 is flared outwardly forming a seat or flange 18. An oil inlet fitting 20 having an annular threaded upper end portion and an internal flow restriction member is centrally secured through the bottom of the housing. In operation the oil inlet fitting 20 is connected into the oil recirculation system of an internal combustion engine. The housing has a lower filter chamber packed with a fibrous filter 22, a preheating chamber 24 above the filter chamber, and a vaporization chamber 26. An oil outlet fitting 28 is secured through the side wall of the housing opening into the lower portion of the vaporization chamber. A felt pad 30 rests on the filter 22 between the preheating chamber 24 and the filter. An annular perforated plate 32 is supported above the pad forming the floor of the preheating chamber. The plate 32 has a central upwardly protruding portion 34 providing space for the head of a bolt 36.

Figure 2:
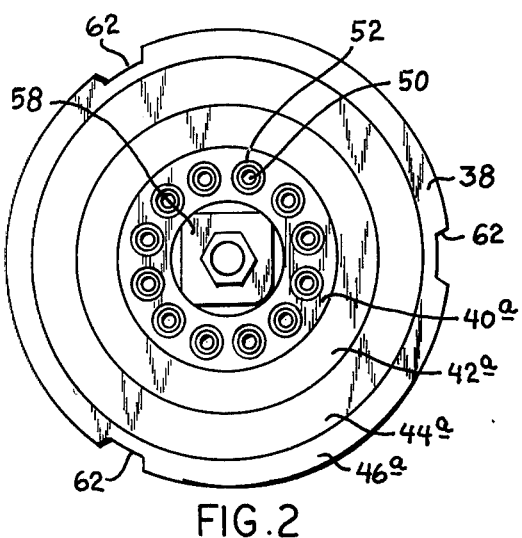
FIG. 2 is a top plan view of the vaporization plate used in the device of FIG. 1.
Figure 4:
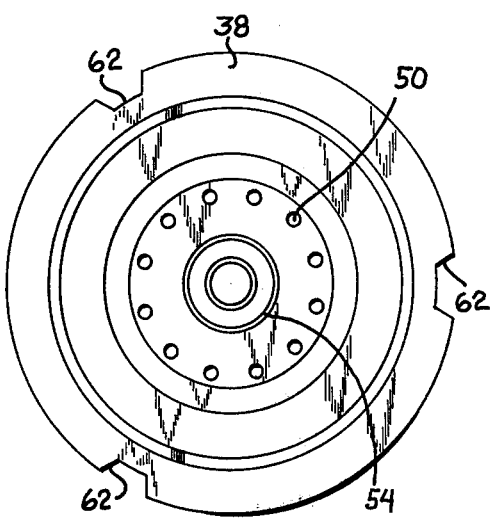
FIG. 4 is a bottom plan view of the vaporization plate of the device.
Figure 3:
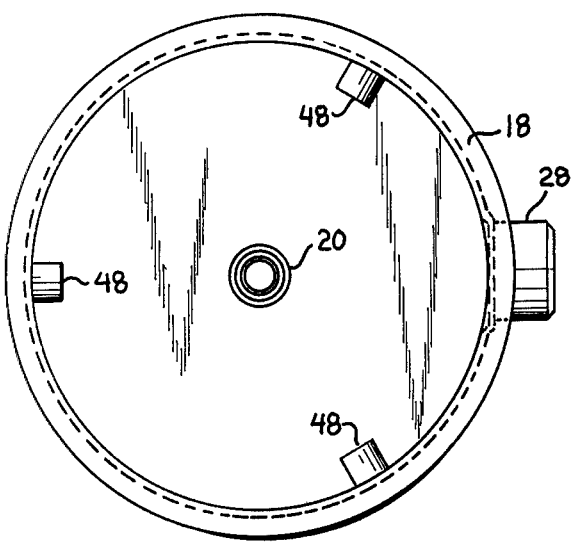
FIG. 3 is a top plan view of the housing of the device with the cap and vaporization plate along with the filter removed.

The ceiling of the preheating chamber 24 and the floor of the vaporization chamber 26 are formed by a vaporization plate 38 which is a frustoconical shell comprising a plurality of annular concentric tiers 40, 42, 44, and 46. The top surface configuration of the vaporization plate is a convex cone surface generally defined by flat annular oil distribution surfaces 40a, 42a, 44a, and 46a as denoted in FIG. 2. Adjacent tiers are, of course, connected by cylindrical vertical wall surfaces down which the oil flows from each tier to the next lower tier. The interior of the vaporization plate is correspondingly shaped defining a conical roof of the preheating chamber 24. Each of the tiers is thick enough for substantial rigidity while being sufficiently thin to minimize the mass of the plate so that the heat-up time is relatively short permitting the device to quickly begin functioning when an engine is started.

The bottom tier 46 of the vaporization plate is retained below a plurality of circumferentially spaced lugs secured within the housing to hold the vaporization plate on the pad 30 above the filter 22.

The top tier 40 of the vaporization plate is provided with a plurality of circumferentially spaced capillaries 50 which extend through the tier to the top surface 40a of the plate opening through expansion cups 52 defined within circular lips or rims 53. The expansion cups are principally at least twice the diameter of the capillaries. Each of the tiers of the vaporization plate is preferably about 0.25 inches thick in the preferred form of the plate made of cast aluminum.

A sufficient number of capillaries 50 and expansion cups 52 are provided in the top tier of the vaporization plate to permit maximum flow of oil through the device depending of course upon a number of variable factors including the required oil flow rate for the engine, the pressures involved, and other physical parameters which vary with engines. It will be recognized that the device may be made in various sizes as it is usable in everything from small automobile and similar vehicle engines to large marine and stationary engines. The number and size of the capillaries must of course accommodate the total flow of the lubricating oil system of the engine while providing for expansion without undue back pressure. The oil flows upwardly through the capillaries, expands through the cups, and flows downwardly sequentially along the flat and vertical surfaces of the four tiers to the outlet. The thin layers of oil along the tiers give maximum exposure to the heat for vaporization of the volatile contaminants. The area of each succeeding lower tier is greater than that of the previous upper tier so that as the oil flows downwardly the film of oil progressively thins. The oil on the bottom tier surface 46a flows along the surface to the outlet fitting 28.

A central integral sleeve 54 is formed within the vaporization plate extending downwardly substantially to the upwardly protruding portion 34 of the perforated plate 32. The bolt 36 holds the plate 32 across the bottom of the vaporization plate within an internal annular recess 56 formed within the base or bottom tier of the plate. An upwardly extending square shoulder portion 58 is formed integral on the plate provided with an internal upwardly opening hexagon shaped recess which receives a nut 60 threaded on the bolt 36 for holding the vaporization plate assembled with the perforated plate 32 as shown in FIG. 1. The outer tier 46 of the vaporization plate is slightly smaller than the internal diameter of the housing 14 and is provided with circumferentially spaced locking notches 62 each of which receives one of the locking lugs 48 for holding the vaporization plate in the housing on the filter. The assembly of the housing with the vaporization plate and filter are carried out by first placing the filter and filter pad within the bottom portion of the housing. The perforated plate 32 is then secured by the bolt 36 with the vaporization plate 38 by means of the nut 60 threaded on the bolt into the upwardly opening recess of the shoulder 58 on the vaporization plate. The vaporization plate and perforated plate as assembled are then placed downwardly in the housing with the notches 62 aligned with the lugs 48. The vaporization plate is then pressed downwardly against the pad 30 until the top face 46a of the bottom tier 46 is below the lugs and the plate is rotated until the notches 62 are misaligned with and below the lugs so that the lugs engage the top face of the surface 46a as shown in FIG. 1. The combined thicknesses of the filter 22 and the pad 30 are sufficient to apply a slight upward force to the bottom face of the tier 46 of the vaporization plate so that the plate is held tightly between the pad 30 and the lugs 48.

Figure 5:
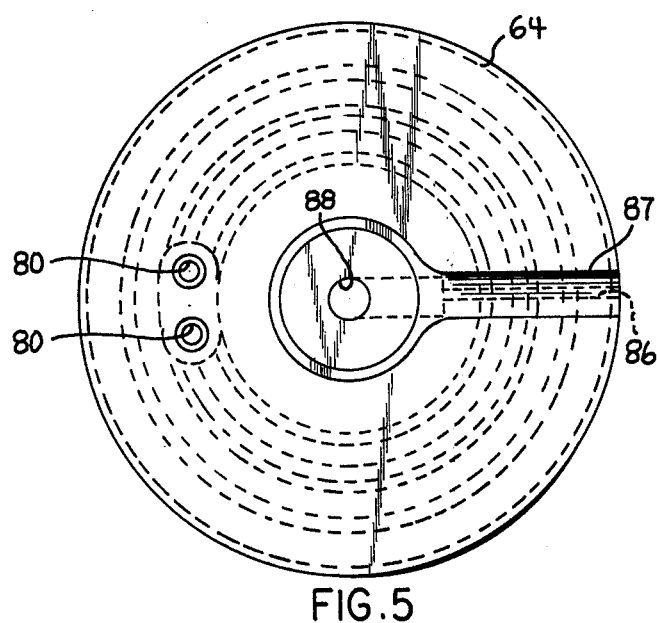
FIG. 5 is a top plan view of the cap of the device as shown in FIG. 1.

The housing 14 is closed at the upper end 16 by a closure cap 64 which has a downwardly sloping annular recess 66 for a seal ring 68 clamped between the lip 18 on the housing and the cap within the recess 66. A gasket 68 is made of any suitable conventional gasket material. The cap 64 has a cylindrical skirt 70 extending downwardly from the lower face of the cap and inwardly of the recess 66. The lower end edge of the skirt 70 defines the lower end of a dome-shaped upper portion of the vaporization chamber 26 as seen in FIG. 1. An annular downwardly opening recess 72 is formed within the skirt 70 for an electrical resistance heating ring 74 which is a conventional resistance heating element 76 covered by a suitable insulating material 78. Opposite ends of the heating element 76 are connected with leads 80 which extend upwardly through spaced openings in the cap 64 as shown in FIGS. 1 and 5 for connection with a suitable power source which supplies electrical energy to the heating element for raising the temperature of the element to a level adequate for heating the vaporization chamber. A frustoconical ring shield 84 is seated within the cap 64 over the annular recess 72 to isolate the heating element from the liquids and vapors within the dome portion of the vaporization chamber.

A vapor vent 86 is provided through the cap 64 into the upper portion of the vaporization chamber 26 to provide for escape of vaporized liquid contaminants from the device.

The cap 64 is provided with a central opening 88 which receives the upwardly extending bolt 36. A wing nut 92 threaded on the bolt holds the cap 64 on the housing 14. The nut 92 is tightened sufficiently on the bolt to pull the cap downwardly toward the vaporization plate which is held by the lugs 48 to tighten the cap against the gasket 68 for sealing the housing against the escape of oil and contaminants which are thus confined to flow through the oil return fitting 28 and the vent passage 86.

The oil reconditioning device 10 is connected for operation into the oil recirculation system of an internal combustion engine, not shown, so that the flow from the engine enters the device through the fitting 20. The oil passes upwardly through the filter 22 and the filter pad 30 where solid particle contaminants are removed from the mixture of oil and liquid contaminants. Of course at the time that the system is activated electrical current is supplied to the leads 80 heating the electrical element 76. The oil flows upwardly from the filter and pad through the perforated plate 32 into the preheating chamber 24. The vaporization plate is heated to a temperature of between about 175° F. and about 225° F. being preferably maintained at a temperature of about 200° F. The conical hollow shape of the vaporization plate permits a rather rapid heating of the plate so that the chamber 24 is heated to vaporize the more volatile liquid contaminants which are released in the chamber 24 and pass upwardly through the capillaries 50. The heated oil and those liquid contaminants which are not volatized in the chamber 24 pass upwardly through the capillaries 50 into the expansion cups 52 where the oil further expands releasing additional volatile contaminants. The oil flows radially outwardly from each of the capillaries over the lip 53 defining each of the cups 52 onto the top surface 40a of the top tier of the vaporization plate. The flowing oil spreads over the top tier and outwardly down the vertical side wall of the top tier to the next lower tier surface 42a where it further spreads and flows to the next annular tier surface 44a from which the oil additionally spreads outwardly and downwardly to the bottom tier surface 46a. The expansion of the oil at the cups 52 tends to deemulsify the oil and liquid contaminant mixture so that the contaminants are more easily vaporized from the oil. Of course as the oil flows downwardly and outwardly in constantly thinning layers it is rapidly heated to the temperature of the vaporization chamber so that the volatized liquid contaminants flow upwardly and outwardly from the device through the vent 86. The shield 84 protects the electrical element 76 from the volatized contaminants and any oil that might tend to splash upwardly from the surface of the vaporization plate. As previously stated the reconditioned oil flows back to the engine from the lower tier 46 through the fitting 28.

It will be recognized that periodically it will be necessary to disassemble the device 10 removing and replacing the filter 22 and the felt pad 30. The frequency of such replacements vary as in conventional filter service depending upon driving conditions, the condition of the engine, and even such factors as the weather. For example, in areas where sandstorms are common the dust in the air requires more frequent replacement of conventional filter elements and would similarly affect the present device. The filter and pad, however, are the only parts of the device which require replacement, the other parts requiring only normal cleaning.

Thus a new and improved oil reconditioning device has been described and illustrated for processing lubricating oil in a recirculating system of an internal combustion engine to permit continuous use of the oil without replacement. The oil is essentially returned to its original state and thus may be repeatedly circulated to the engine. The only additional oil which will be required in the engine is that quantity which may be burned by the engine or lost through leakage. The device is provided with a vaporization plate which is a hollow frustoconical member comprising a plurality of flat concentric tiers which define the floor of the vaporization chamber and the ceiling of a preheating chamber. The preheating chamber provides improved vaporization of liquid contaminants. The reduced mass of the tiered conical vaporization plate speeds up the heating of the device to operational temperature.

What is claimed is:

1. An oil reconditioning device for removing solid and liquid contaminants from lubricating oil comprising: a housing having an inlet at a lower end; an oil filter chamber in the lower portion of said housing; a filter in said filter chamber for removing said contaminants from said oil; a preheating chamber in said housing above said filter chamber; a hollow convex frustoconical vaporization plate comprising a plurality of concentric tiers within said housing on said filter above said filter chamber, the uppermost tier of said vaporization plate being provided with a plurality of circumferentially spaced capillaries for flow of oil and contaminants through said plate; the bottom face of said vaporization plate defining the roof of a frustoconical preheating chamber between said filter and said vaporization plate for initially heating oil and liquid contaminants to vaporize the more volatile of said contaminants; the top face of said vaporization plate defining the floor of a vaporization chamber within said housing; a perforated plate secured with the bottom of said vaporization plate defining a floor of said preheating chamber; heating means in the upper portion of said housing for heating said vaporization chamber, said vaporization plate and said preheating chamber; said vaporization plate being formed of a heat conducting material for heating said preheating chamber; means defining a side outlet from said housing immediately above the lowermost tier of said vaporization plate opening into said vaporization chamber; and means providing a vent passage from said vaporization chamber in the upper portion of said housing for escape of vaporized contaminants from said vaporization chamber.

2. A device in accordance with claim 1 wherein each of said tiers of said vaporization plate has substantially flat top and bottom surfaces, said surfaces being parallel with each other and perpendicular to the longitudinal axis of said vaporization plate.

3. A device in accordance with claim 2 including means defining an expansion cup surrounded by an annular lip in the top face of the uppermost tier of said vaporization plate opening into each of said capillaries.

4. A device in accordance with claim 3 wherein each of said tiers of said vaporization plate is substantially 0.25 inches thick and said plate is formed of cast aluminum.

5. A device in accordance with claim 4 wherein said vaporization plate includes four concentric tiers.

6. A device in accordance with claim 5 including an annular frustoconical shield secured in the upper portion of said housing between said heating element and said vaporization chamber.

7. A device in accordance with claim 6 including means defining a dome-shaped roof around the upper portion of said vaporization chamber within said housing.

8. A device in accordance with claim 7 wherein said perforated plate is provided with a protruding central portion extending upwardly toward said vaporization plate and said vaporization plate has a central integral sleeve portion extending downwardly therefrom toward said perforated plate.

9. A device for reconditioning oil in a recirculating system of an internal combustion engine for removing solid and liquid contaminants from said oil, said device comprising: a cylindrical housing having a main body portion and a removable cap portion; an oil inlet fitting in the bottom panel of said housing; a fibrous filter within the lower portion of said housing for removing solid contaminants from oil flowing into said housing through said inlet fitting; a frustoconical shell-shaped vaporization plate supported in said housing above said filter, said vaporization plate comprising a plurality of concentric annular tiers each having substantially flat bottom and top surfaces, such surfaces lying in planes perpendicular to the axis of said frustoconical shape of said vaporization plate, said tiers both internally and externally of said vaporization plate being connected by vertical cylindrical walls, the uppermost of said tiers being provided with circumferentially spaced capillaries and the upper face of said uppermost tier having cylindrical expansion cups defined within annular lips opening into said capillaries; an oil outlet fitting in an upper side portion of said housing above the lowermost of said tiers of said vaporization plate; an annular perforated plate secured across the bottom face of said vaporization plate; the bottom face of said vaporization plate and the top face of said perforated plate defining a frustoconical preheating chamber within said vaporization plate above said filter; said vaporization plate being formed of a heat conducting material for heating said preheating chamber; the top face of said vaporization plate and internal surfaces defined within said cap of said housing defining a vaporization chamber above said vaporization plate, said vaporization chamber having a frustoconical tiered floor and a dome-shaped roof; means defining an annular recess within said cap around said vaporization chamber; a ring-shaped electrical resistance heater in said recess of said cap; a frustoconical shield in said cap between said electrical resistance heater and said vaporization chamber; electrical lead means connected through said cap to said resistance heater; and means defining a vent passage through said cap into said vaporization chamber.

* * * * *